United States Patent [19]

Singer

[11] Patent Number: 5,019,203
[45] Date of Patent: May 28, 1991

[54] DOUBLE SIDED LAMINATING MACHINE

[75] Inventor: Karl Singer, Barrington Hills, Ill.

[73] Assignee: D&K Custom Machine Design, Inc., Elk Grove Village, Ill.

[21] Appl. No.: 389,510

[22] Filed: Aug. 4, 1989

Related U.S. Application Data

[60] Continuation-in-part of Ser. No. 104,604, Oct. 5, 1987, abandoned, which is a division of Ser. No. 903,391, Sep. 3, 1986, Pat. No. 4,743,334, which is a continuation-in-part of Ser. No. 830,852, Feb. 19, 1986, abandoned.

[51] Int. Cl.[5] .................. B32B 31/10; B32B 31/12; B32B 31/20
[52] U.S. Cl. .................. 156/309.9; 29/132; 100/93 RP; 156/320; 156/499; 156/555; 156/582; 156/583.1; 226/177; 226/178; 226/187; 226/191
[58] Field of Search .................. 156/301, 309.9, 320, 156/499, 555, 582, 583.1; 100/93 P, 93 RP; 29/121.8, 132; 226/111, 176, 177, 186, 187, 178, 191

[56] References Cited

U.S. PATENT DOCUMENTS

| | | |
|---|---|---|
| 2,831,097 | 4/1958 | Malewski . |
| 3,143,454 | 8/1964 | Hannon .................. 156/499 |
| 3,208,898 | 9/1965 | Chavannes et al. .................. 156/582 |
| 3,465,941 | 9/1969 | Fournier .................. 226/186 |
| 3,764,441 | 10/1973 | Bley .................. 156/555 |
| 4,158,429 | 6/1979 | Ohmori .................. 226/186 |
| 4,310,365 | 1/1982 | Elliott et al. .................. 156/499 |
| 4,441,417 | 4/1984 | Katayama et al. .................. 29/121.8 |
| 4,484,959 | 11/1984 | Boucher et al. .................. 29/132 |
| 4,610,747 | 9/1986 | Bregenzer .................. 156/555 |

FOREIGN PATENT DOCUMENTS 0261246 3/1988 European Pat. Off. .
1219431 1/1971 United Kingdom .

*Primary Examiner*—Michael Wityshyn
*Attorney, Agent, or Firm*—Wallenstein Wagner & Hattis, Ltd.

[57] ABSTRACT

A laminating system includes a pair of heated laminating rollers (14, 110) for drawing laminating film (12, 114) from supply rolls and preheat members (30, 118) between the supply rolls and the laminating rollers. The preheat rollers are heated internally by a recirculating fluid system or by an electrical mechanism (212–220), while the laminating rollers are heated by a fluid system (70–82) or a separate electrical system. The system also includes pull rollers (18) for drawing the laminated articles from the laminating rollers and a blower system (20, 232) for cooling the articles.

10 Claims, 5 Drawing Sheets

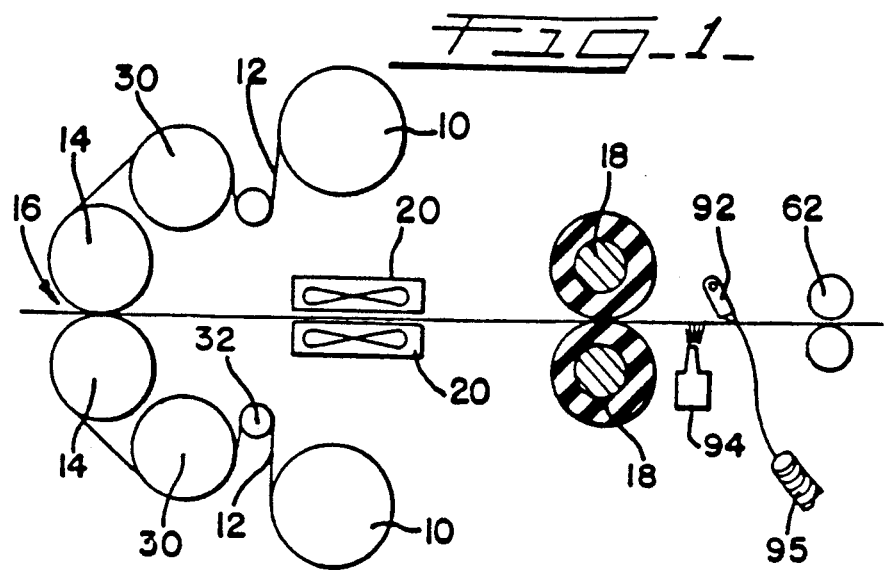
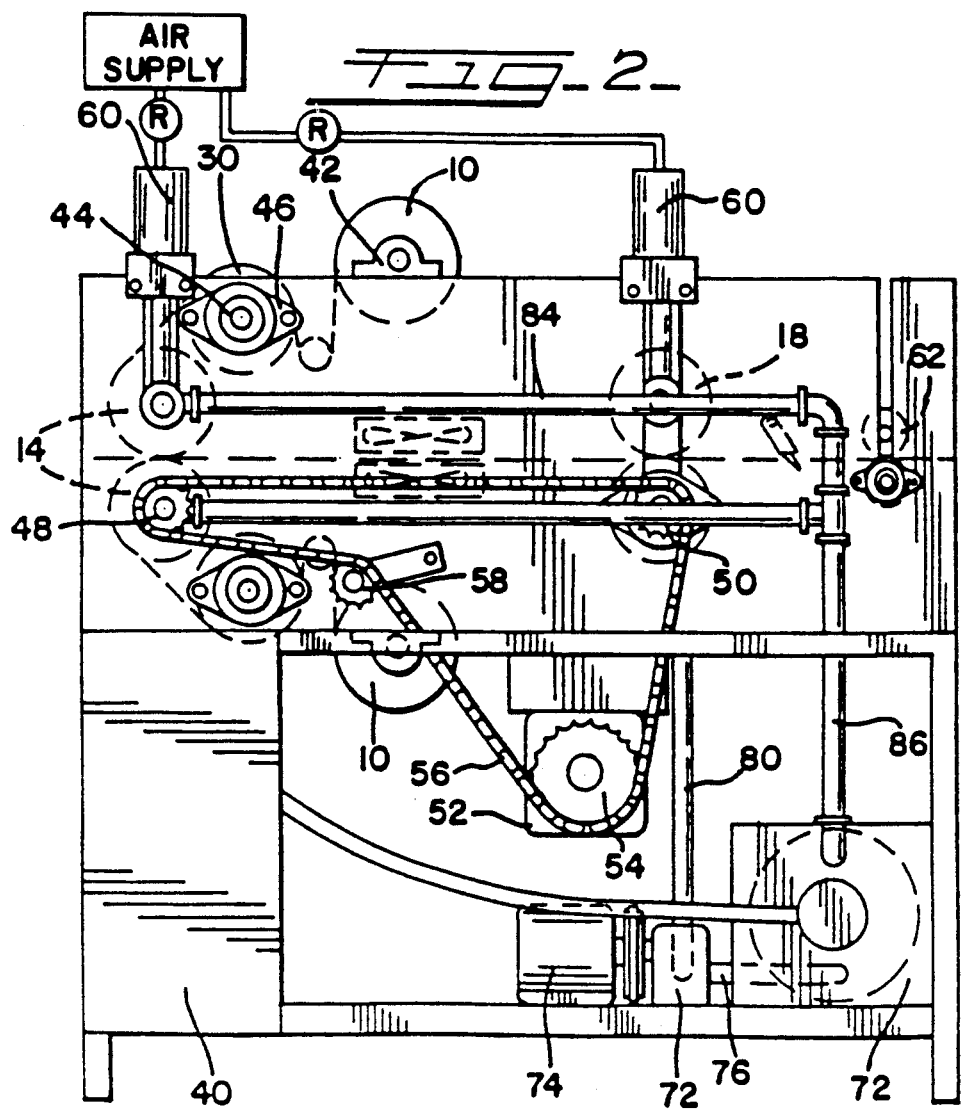

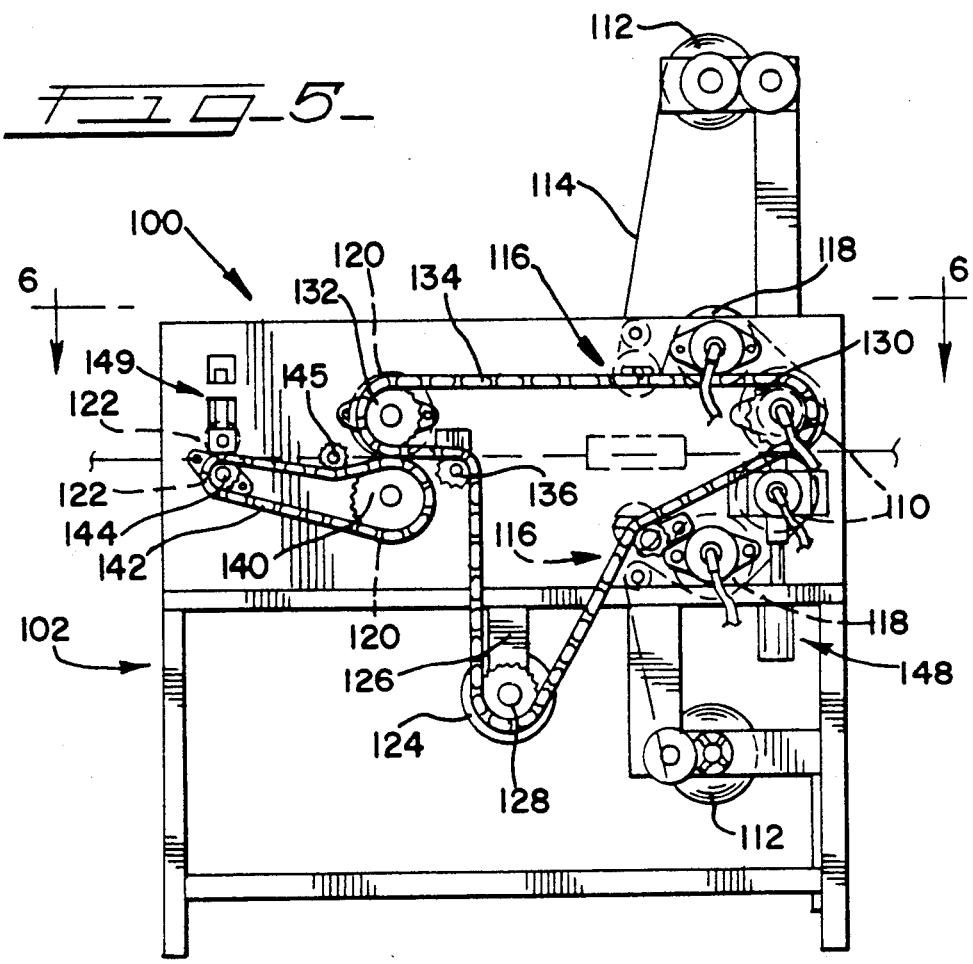
FIG_5_
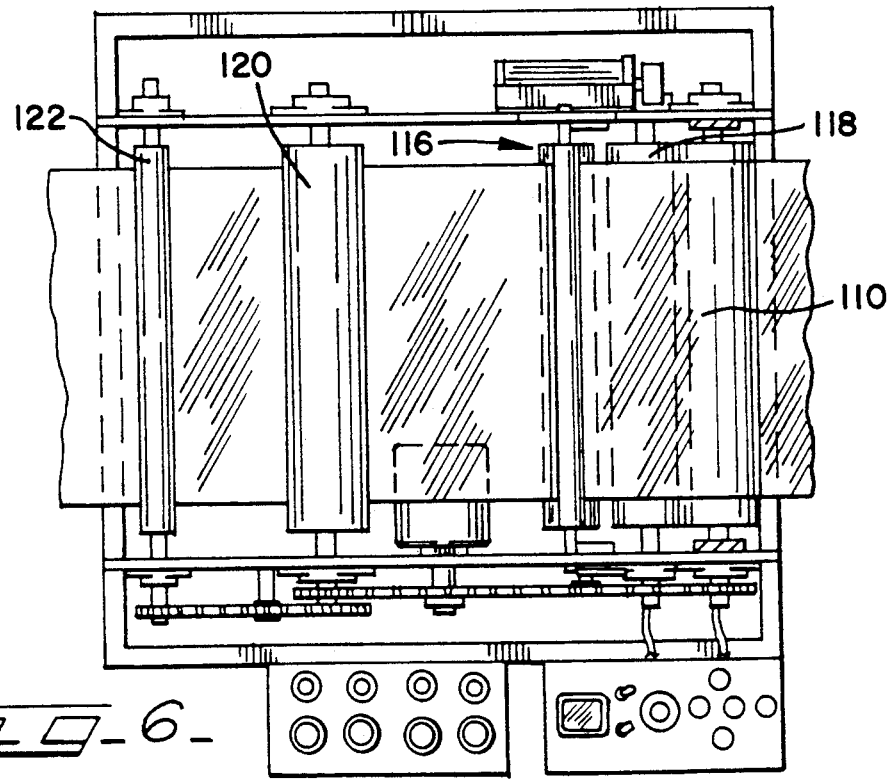
FIG_6_

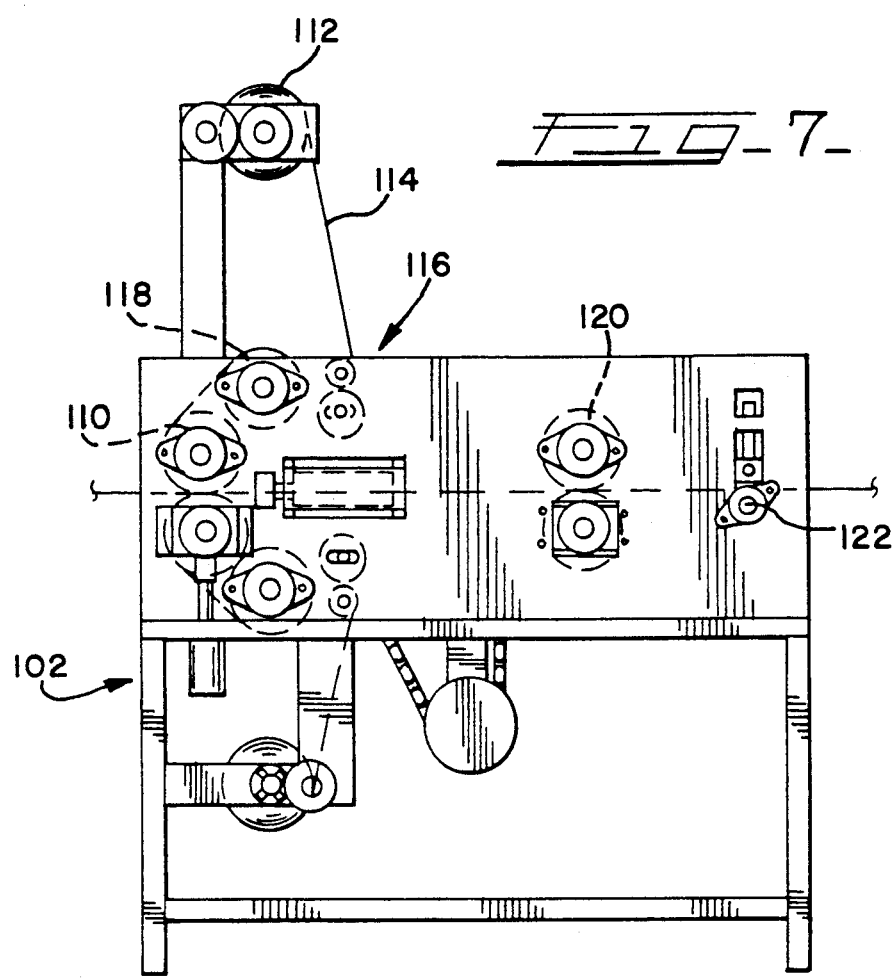
FIG-7-
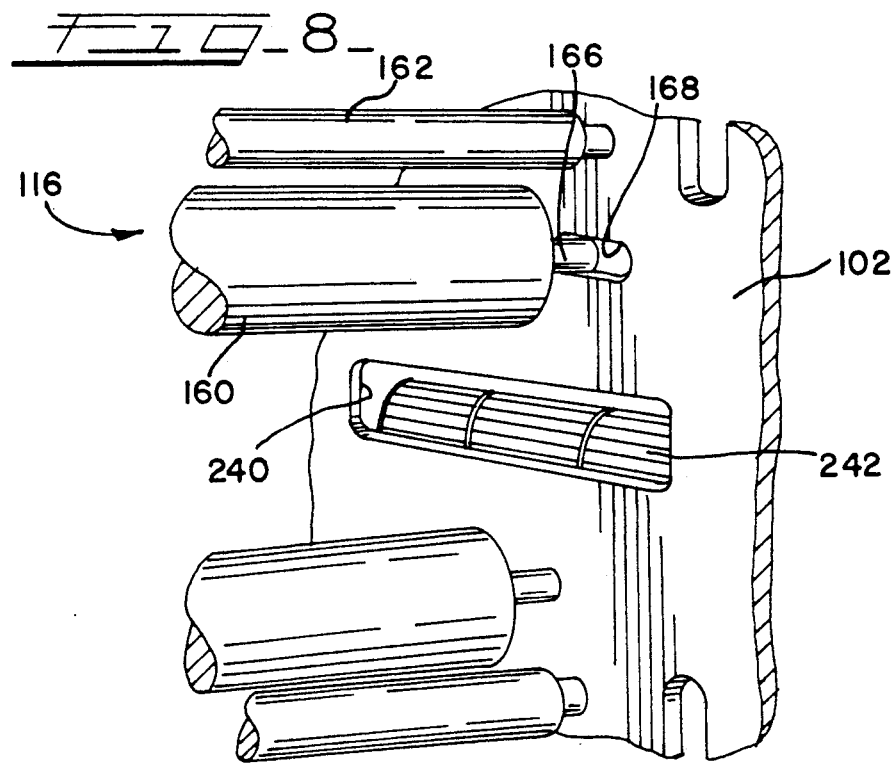
FIG-8-

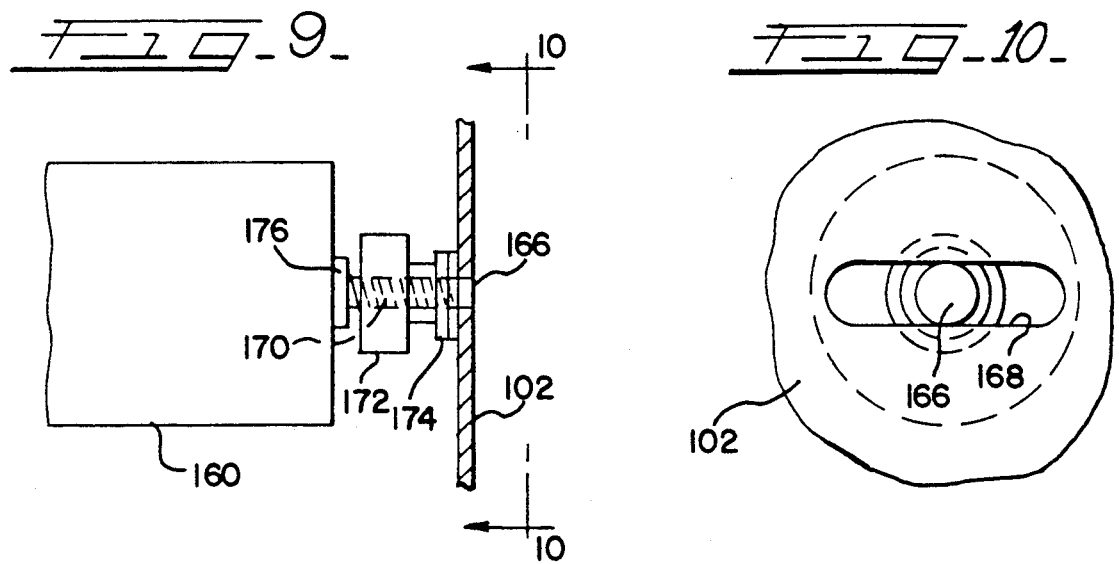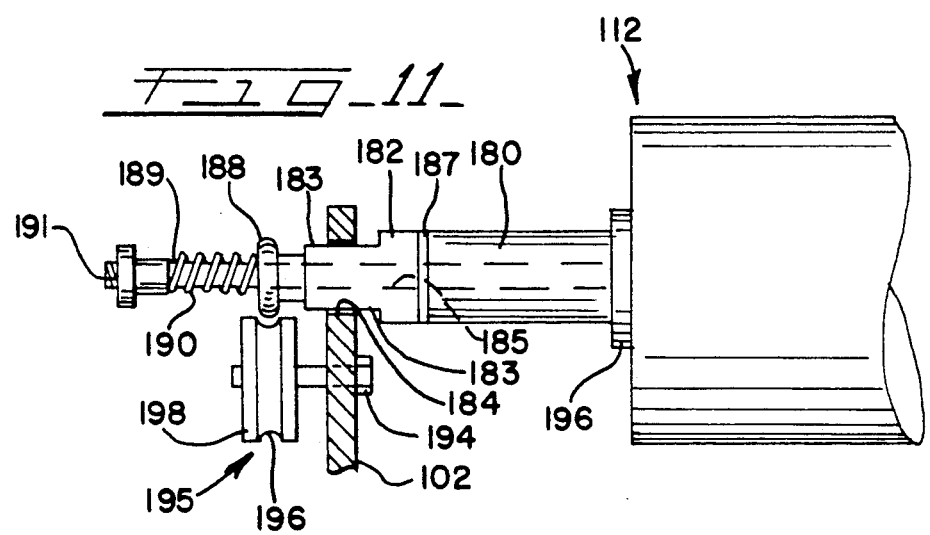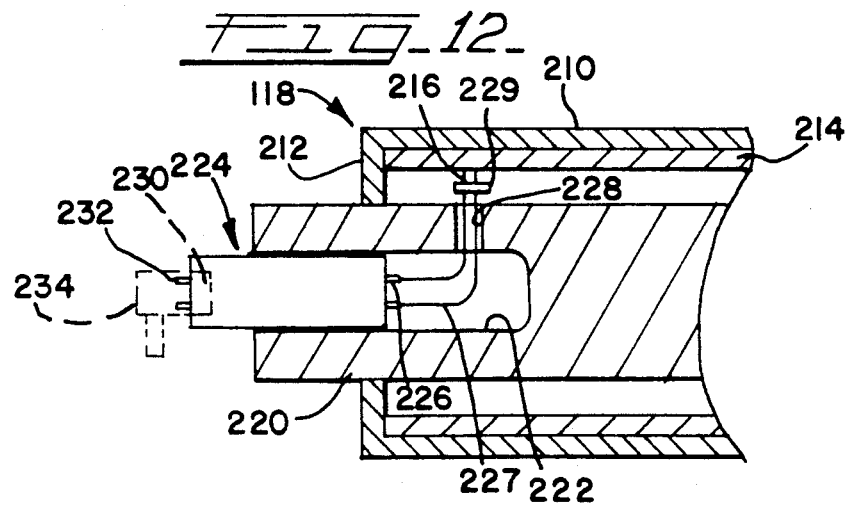

DOUBLE SIDED LAMINATING MACHINE

REFERENCE TO RELATED APPLICATION

This application is a continuation-in-part application of U.S. Ser. No. 104,604, filed Oct. 5, 1987, now abandoned, which is a Divisional application of U.S. Ser. No. 903,391, filed Sept. 3, 1986, now U.S. Pat. No. 4,743,334, which in turn is a continuation-in-part application of U.S. Ser. No. 830,852, filed Feb. 19, 1986, now abandoned.

TECHNICAL FIELD

The present invention relates generally to laminating machines and, more particularly, to a continuous laminating system for laminating an article between two sheets of laminating film.

BACKGROUND PRIOR ART

Laminating systems for applying two sheets of plastic film on opposite surfaces of an article have been known for a number of years. Examples of such systems are disclosed in U.S. Pat. Nos. 3,309,983; 4,268,345; and, 4,090,911. In all of these systems, a pair of supply rolls supply two continuous webs of film between and into the nip of a pair of pressure laminating rolls which also receive the article therebetween.

Respective webs of laminating film have a heat-activated coating on one surface thereof and the system includes shoe-type heating members that are partially wrapped around the laminating rollers to heat the rollers. The respective webs of film are entrained over the arcuate shoes to heat the film sufficiently to activate the adhesive so that it becomes slightly fluent and the pressure laminating rollers bond the heated webs to the article, which is sandwiched therebetween. In this type of system, pull rollers are located downstream of the pressure rollers and maintain tension on the laminated article as it is being moved between cooling fans, located above and/or below the laminated article.

The shoe-type heating members usually are heated through electrical resisting heating elements that are either mounted in the shoes or adjacent the rear surface thereof. The shoes define generally arcuate surfaces over which the laminating film passes to provide extended contact with the film immediately prior to entering the nip of the laminating rollers and thus activate the adhesive.

Certain problems have been encountered with laminating systems of this type and the primary shortcoming is the unevenness of the heat produced by the shoetype member which results in varying temperatures across the entire width of the web. In addition, the partially-heated film immediately enters the laminating area from the heated shoes and does not allow for adequate transfer of the heat applied to the sheets to the adhesive and also does not allow for distribution of the heat across the sheets. It will be appreciated that uneven heat applied across the web of the sheet can produce either overheating or underheating of the web, which will result in a defective product.

Another problem encountered with the prior art systems is the fact that the laminating film must be of a certain character and, thus, the number of different laminating films that can be used is limited. For example, in the systems disclosed in the prior art, all of the heating of the laminating film is done by the stationary heated shoes immediately before the laminating film enters the nip between the pressure rollers. This is necessary to prevent stretching or elongation of the film in the heated condition, which may cause the film to wrinkle. This is particularly true when using a film such as polypropylene and, thus, these types of machines are incapable of laminating articles utilizing films other than polyethylene.

Thus, prior art laminating is effectively limited to using polyethylene films which can be heated by the stationary heated shoes of the type disclosed in U.S. Pat. No. 4,268,345 without stretching or wrinkling.

A further problem with the prior art types of machines is the fact that the speed is extremely limited since the film must be in contact with the heating shoes a sufficient amount of time to elevate the temperature thereof sufficiently to activate the adhesive. Thus, it is necessary to limit the speed of operation to obtain the proper heating characteristics, which may vary depending upon the adhesive and the type of polyethylene film that are being utilized.

SUMMARY OF THE INVENTION

According to the present invention, a new system has been developed wherein the laminating film is preheated to a temperature below the activating temperature of the adhesive being used at a location spaced from the laminating rollers and the pressure laminating rollers are also heated to heat the sheet to a temperature at or above the activating temperature for the adhesive. The system is capable of laminating films that heretofore were not practical because of the limited speeds.

More specifically, the present invention is directed to a continuous laminating system which includes a pair of pressure laminating rollers that define a nip to which an article is fed along with a pair of laminating films having heat-activated adhesive thereon. In the illustrated embodiment, the system includes a pair of pull rollers downstream of the laminating rollers and a pair of film supply rolls upstream of the laminating rollers with a pair of preheat rollers respectively engaging the films between the supply rolls and the laminating rollers.

According to one aspect of the invention, the laminating rollers and the preheat means are respectively heated to above and below the activated temperature of the adhesive to produce a substantially uniform temperature of the sheet along the length of the rollers.

According to one aspect of the present invention, the preheat rollers and the laminating rollers are spaced from each other to allow the sheet to heat more uniformly across the width thereof. Also, the preheat rollers are positioned with respect to adjacent guide rollers and the laminating rollers to provide extended surface contact through an arc approaching 180°. This extended contact provides a significant amount of preheating for the laminating film to uniformly heat the heat activated adhesive and the spacing between the laminating rollers and the preheat rollers provides time for the heat to be transferred through the film to the heat activated adhesive layer as well as being distributed across the sheet.

The preheat rollers can be heated by suitable means. In one embodiment of the invention, the heating means includes an incompressible fluid circulating system that heats the surface of the rollers to a temperature in the range of about 200°–220° F. while the laminating rollers are heated to a temperature of about 250°–260° F. by a separate and isolated circulating system of an incompressible fluid. Thus, more accurate independent control is provided for heating the respective preheat rollers and the laminating rollers.

In an alternate embodiment of the invention, the preheat rollers are heated by a specialized electrical heating means that is attached to an inner surface of the hollow preheat rollers while the laminating rollers are also heated by separate electrical heating means to provide independent control of the heating of the respective sets of rollers.

In the alternate embodiment of the invention, the electrical heating means and the arrangement of the components produces a very compact unit that can be manufactured at a reduced cost.

According to one aspect of the present invention, the laminating rollers and the pull rollers are configured to readily vary the effective speed by a simple adjustment. For this purpose, the rollers are hollow central metal cores having a layer of compressible material, such as rubber, so that the effective diameter can be varied by adjusting the pressure between the respective rollers.

BRIEF DESCRIPTION OF DRAWINGS

FIG. 1 schematically illustrates a continuous double laminating system incorporating the present invention;

FIG. 2 is a side elevational view of the laminating machine showing the details of construction;

FIG. 5 is a side view similar to FIG. 3, showing a modified form of laminating system;

FIG. 6 is a top plan view, as viewed along line 6—6 of FIG. 5;

FIG. 7 is a side elevational view of the laminating machine, showing the side opposite that shown in FIG. 5;

FIG. 8 is a fragmentary exploded perspective view showing the idler or directing rollers of FIG. 5;

FIG. 9 is a fragmentary side elevational view showing the adjustment for the directing rollers;

FIG. 10 is an end view, as viewed along line 10—10 of FIG. 9;

FIG. 11 is a fragmentary cross-sectional view of the friction-producing means for the supply rollers;

FIG. 12 is a fragmentary cross-sectional view of a preheat roller included in the embodiment of FIG. 5;

DETAILED DESCRIPTION

Figure 3:
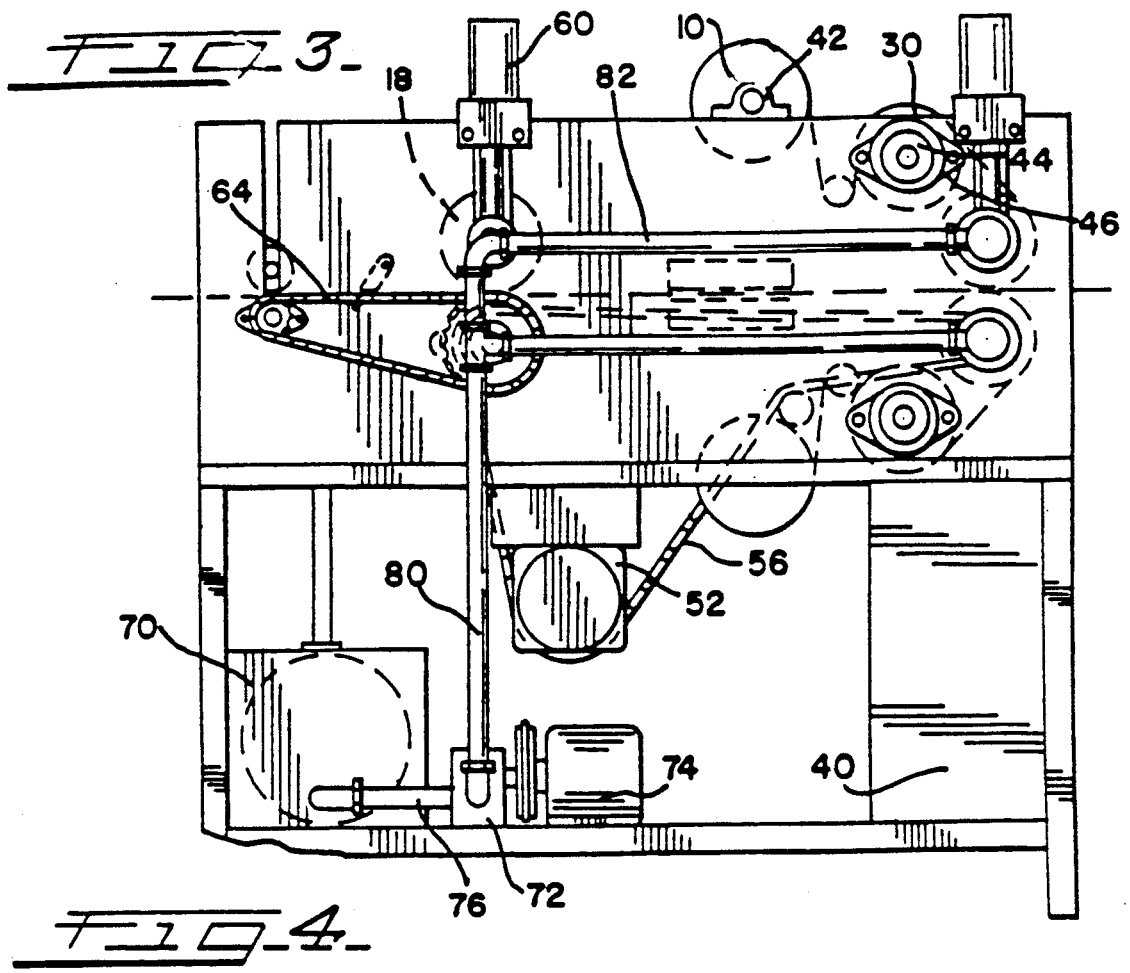
FIG. 3 is a side elevational view of the opposite side of the machine shown in FIG. 2.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, the laminating system disclosed therein is specifically designed for applying two films onto opposite surfaces of an article. The system includes a pair of film supply rolls 10 which supply continuous webs of film 12 between a pair of pressure laminating rollers 14, that cooperate to define a nip 16 therebetween. An article (not shown) to be laminated is also fed into the nip 16 between the two webs of film 12. The webs of film 12 have a heat activatable adhesive on one surface thereof which becomes tacky when heated and adheres to the article. A pair of pull rollers 18 are located downstream of the laminating rollers and maintain tension on the film while moving between a pair of cooling fans 20.

In the prior art method of continuous laminating systems for double laminating articles, stationary heated shoes are positioned to at least partially surround the laminating rollers 14 and provide a stationary surface over which the film is drawn and the stationary surfaces are heated, utilizing electric heaters inside the shoes. Such a system is disclosed in U.S. Pat. No. 4,268,345. However, with such systems, it is difficult to evenly heat the web of film across its entire width. Also, it has been found that certain plastic films, such as polypropylene, cannot be used in the laminating system disclosed in the above patent because the polypropylenes will have a tendency to stretch when heated to a temperature sufficient to activate the adhesive on one surface thereof.

According to the primary aspect of the present invention, the continuous double laminating system incorporates a preheat means between the film supply rolls 10 and the laminating rollers 14 to preheat the laminating film 12 to a temperature below the adhesive-activating temperature. In the embodiment illustrated in FIG. 1, the preheat means is in the form of a pair of freely rotatable rollers 30 which are located between the supply rolls 10 and the laminating rollers 14.

A pair of idler or dewrinkler rollers 32 are located between the preheat rollers and the supply rolls 10 and are positioned so that there is substantial contact between at least half of the preheat roll surface and the film. According to one aspect of the invention, the laminating rollers 14 are also heated to a temperature above the activating temperature for the adhesive and there is substantial contact between about one-half of the laminating surface and the film.

Thus, in the illustrated embodiments, independent, separate heating means are provided for the preheat rollers and the laminating rollers which allow for independent adjustment for the temperature of the respective sets of rollers.

Also, the respective reversing rollers 32, preheat rollers 30, and laminating rollers 14 are positioned to define a sinusoidal path from the supply roll 10 to the laminating rollers 14. More specifically, the idler or reversing rollers 32 are positioned to reverse the path of the film by almost 180° and then pass over the preheat rollers 30 where the direction is again reversed and directed to the laminating rollers at an acute angle to have extended surface contact of substantially more than 90° with respect to the laminating rollers 14.

Figure 4:
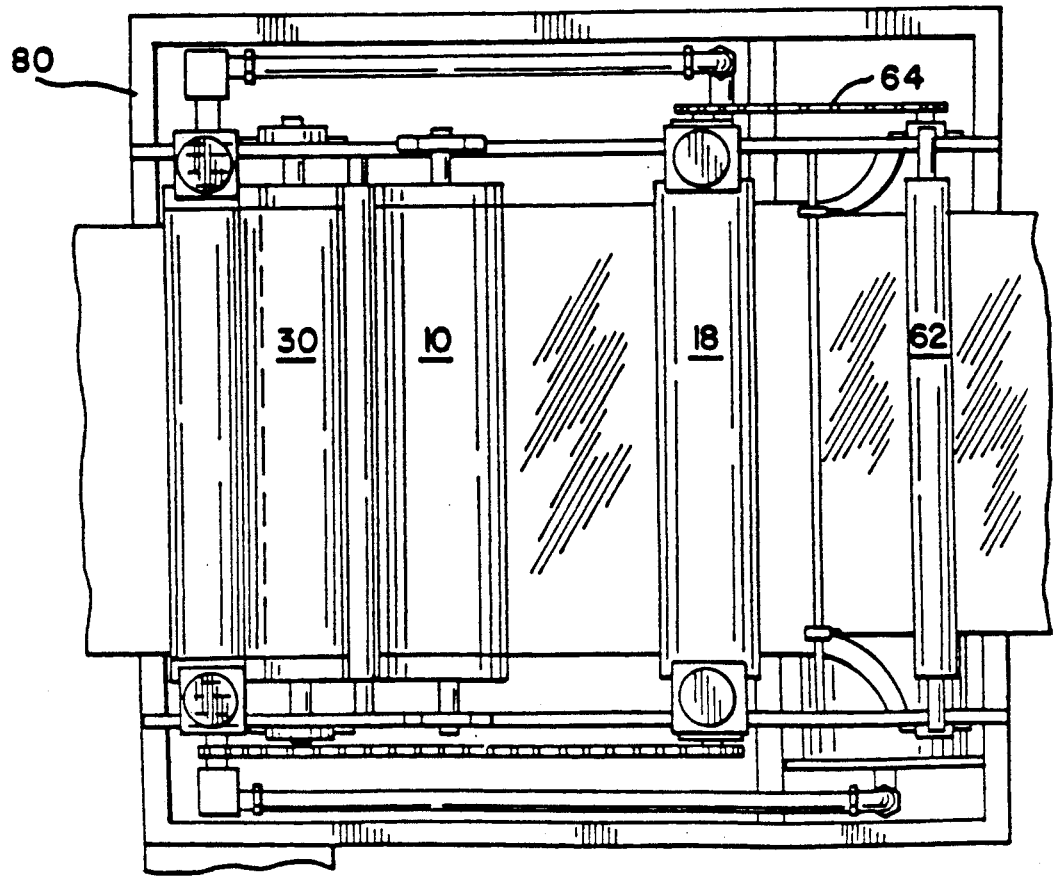
FIG. 4 is a top plan view of the machine shown in FIG. 2.

FIGS. 2, 3 and 4 disclose one embodiment of the machinery that is utilized for carrying out the laminating process, schematically illustrated in FIG. 1. As shown in FIG. 2, a frame or base 40 supports the supply rolls 10 through bearing brackets 42 so that the supply rolls are freely rotatable and the webs of film 12 can be pulled off the supply rolls while the rolls are rotated by the pulling force of the laminating rollers 14.

The preheat rollers 30 are likewise freely rotatable on the frame and are supported by bearings 44 carried by brackets 46 on the frame. In addition, the lower laminating roller 14 and the lower pull roller 18 are rotated about fixed axes and have drive sprockets 48 and 50, respectively, secured thereto. A drive motor 52 has an output driven sprocket 54 and a chain 56 is entrained over sprockets 48, 50 and 54 so that the lower laminating roller and the lower pull roller are driven by the same power source.

An adjustable idler sprocket 58 may be utilized for maintaining the desired tension on the chain or other equivalent drive means 56. The upper laminating roll and the upper pull roller 18 are adjustably mounted through pneumatic cylinders 60 so that the rollers can be raised and lowered with respect to the lower fixed rollers 14 and 18 to adjust the pressure between the laminating rollers 14 and the pull rollers 18.

In addition to the pull rollers 18, the system also has supplemental pull rollers 62, for a purpose that will be described later. The lower supplemental pull roller 62 is again fixed for rotation on the frame 40, while the upper pull roller 62 is adjusted utilizing a cylinder arrangement 60 (not shown). The supplemental pull rollers 62 are driven by a chain 64 (FIG. 3) from lower pull roller 18.

In the system so far described, the lower laminating roller 14 and the lower pull roller 18 are positively driven by motor 52 which, in turn, drive the upper laminating roller 14 and the upper pull roller 18. This will draw the film off of the supply rolls 10 across the idler roller 32 and the freely rotatable preheat rollers 30 into the nip 16 of the laminating rollers 14. The pull rollers 18 will maintain the laminating film and the article in a taut condition as they are passed between the cooling fans 20.

As an alternative, the upper laminating roller and the upper pull rollers can be driven as well as the two preheat rollers while the lower pull roller and the lower laminating roller are adjustable. The advantage of this arrangement is that the system is automatically shut down in the event of air pressure loss because gravity will lower the rollers 14 and 18 to separate the respective sets of rollers.

According to the primary aspect of the invention, the laminating rollers 14 and the preheat rollers 30 are heated utilizing separate heated liquid and pump means for circulating the heated liquid through the respective rollers. Thus, as shown in FIGS. 2 and 3, a liquid supply reservoir 70, such as an oil reservoir, is connected by a conduit 76 to a pump 72 which is driven by a motor 74 with the conduit 76 communicating with a lower portion of the reservoir. An oil supply conduit 80 leads from the outlet of the pump 72 and has two branch conduits 82 (FIG. 3) that respectively are connected to one end of each of the laminating rollers 14. The heated liquid or oil is thus pumped through the laminating rollers in an axial direction and is returned to the reservoir 70 through branch conduits 84 and return conduit 86 (see FIG. 2).

The preheat rollers 30 are likewise heated by having a heated liquid, such as oil, pumped in an axial direction through the roller utilizing a system similar to the system described in connection with the laminating rollers 14, but the temperature of the oil is lower than the temperature of the oil in the supply reservoir 70. For purposes of clarity, the second duplicate oil system for the preheat rollers has not been shown in the drawings.

Alternatively, the preheat rollers could have a predetermined amount of oil sealed in a hollow cylindrical chamber formed in the center of the rollers which could be heated utilizing electric heating rods.

With the system so far described, the webs of film 12 are drawn off the supply rollers by the positively-driven laminating rollers and the pull rollers and pass across idler rollers 32 which act as dewrinkler and reversing rollers and come into contact with the preheat rollers 30, which preheat the webs of film to a temperature below the adhesive-activating temperature. The webs of film then come into contact with the surfaces of the laminating rollers 14, which provides further heating of the film to a temperature sufficient to activate the adhesive and complete the laminating process. The laminated articles, along with the continuous laminated film, are then passed between the cooling fans by the pull rollers 18 where the sheet is cooled sufficiently to set the adhesive.

According to one aspect of the present invention, the second set of pull rollers 62 are driven by a chain 64 from the lower pull roller 18 and maintain the laminated article taut between the rollers 18 and 62, while the edges are being trimmed by cutter elements 92 (FIG. 1). Cooling nozzles 94 are located below and upstream of the cutter elements 92 to further cool the edges and insure that the edges are sufficiently cooled so that a clean cut is produced by the cutter blades 92. The excess material that is severed by the cutter blades 92 is drawn into a vacuum tube 95 for disposal.

It has been found that the use of the preheat rollers 30 between the supply rollers and the laminating rollers and the final heating of the webs of film by the laminating rollers not only allows for significant increases in laminating speeds but also results in superior laminated articles. Furthermore, the use of the circulating oil through the laminating rollers 14 and the preheat rollers 30 provides extremely uniform temperatures across the entire width of the webs to provide a superior laminated article.

A further advantage of the laminating system is that the preheat rollers do not heat the laminating film sufficiently so that it will stretch while being suspended in air between the preheat rollers and the laminating rollers. Thus, it has been found that a greater variety of films can be utilized in the laminating proces since the film is not actually heated to the laminating temperature where it might stretch until it is in contact with the laminating rollers and is being laminated to the articles. While the temperature parameters will vary according to the adhesive being utilized and the film that is used in the process, it has been found that excellent results are obtained if the preheat rollers are at a temperature in the vicinity of 200°-220° F. and the laminating rollers at a temperature of about 250°-260° F.

According to one aspect of the invention, a unique system has been developed for controlling the speed of the pull rollers with respect to the laminating rollers. As was indicated above, the laminated film with the enclosed article must be kept in a taut condition as it is being cooled by the cooling fans. Thus, the pull rollers must be driven at a slightly higher speed than the laminating rollers. It is also known that different films and different thicknesses will require changes in the relative speeds between the two sets of rollers to prevent stretching of the film while it is in a heated condition.

It has been ascertained that the relative speed between the laminating rollers and the pull rollers can be accurately controlled by forming the rollers with a compressible material and then adjusting the air pressure in cylinders 60. Accordingly, at least the pull rollers have a central steel core surrounded with a compressible rubber material (FIG. 1). The compressible rubber preferably has a durometer hardness of about 45 to 55. Thus, by varying the air pressure in cylinders 60, the effective diameter of the rollers will be changed to increase or decrease the speed of the rollers. The air pressure in cylinder 60 can be controlled using pressure regulators between the source and the cylinders, as shown in FIG. 2. If desired, the laminating rollers could also be slightly smaller in diameter than the pull rollers.

It should be noted that while one type of differential drive means has been described, other drive means, such as clutches, could be substituted.

A slightly modified form of the laminating machine is disclosed in FIGS. 5-12 of the specification and this embodiment is specifically designed to provide a significantly more-compact unit that can readily be produced at a price significantly less than the price of the unit shown in the embodiment of FIGS. 1-4, while still providing the advantages thereof. The modified embodiment of the invention is still capable of effectively laminating articles with films having different properties at speeds greater than was heretofore possible.

Referring now to FIG. 5, the laminating machine is generally designated by reference numeral 100 and includes a frame 102 that supports all of the laminating structure to be described. The laminating machine incorporates a pair of laminating rollers 110 that have films applied thereto from supply rolls 112, with the film 114 passing over an idler and reversing roll mechanism 116 and a preheat roller 118.

As in the previous embodiment, the reversing or idler roll mechanism 116 and the preheat roller 118 are positioned to define a generally sinusoidal path between the film supply roll 112 and the laminating roller 110 for the film 114 to maximize the amount of heat that can be absorbed from the preheat rollers, as well as the laminating rollers during the laminating process. Moreover, the preheat roller 118 is again spaced from the laminating rollers 110 to provide an area where the film is suspended in air to allow for adequate transfer of heat from the laminating film to the adhesive layer that is on the exposed surface of the laminating film.

Thus, as shown in FIG. 5, the film 114 is delivered along a substantially vertical path from the supply roller 112 to the reversing roller mechanism 116 and then is reversed and directed generally parallel to the first segment of the path, being reversed by an angle approaching 180°, before it comes into engagement with the surface of the preheat roller. The film 114 thus is in contact with the preheat roller 118 through an arc of substantially more than 90° and preferably approaching 180°. This same film is also in extended surface contact with the periphery of the laminating roll through an arc of significantly more than 90°, more preferably on the order of about 135°.

The laminating system 100 shown in FIG. 5 also includes a pair of primary pull rollers 120 and a pair of secondary pull rollers 122, with the rollers 110, 120 and 122 all being driven from a common power source. The power source is preferably an electric motor 124, which is supported by brackets 126 on the frame 102 and has an output sprocket 128 connected to the output shaft thereof. Likewise, upper laminating roll 110 has a drive sprocket 130 secured to the support shaft thereof, while a drive sprocket 132 is connected to the shaft of the upper primary pull roller 120. A drive chain 134 is entrained over sprockets 128, 130, 132, as well as an adjustable idler sprocket 136.

The drive mechanism also incorporates a further sprocket 140 connected to the support shaft of the lower primary pull roller 120 and has a drive chain 142 entrained thereon and also entrained over a sprocket 144 connected to the lower secondary pull roller 122. An adjustable sprocket 145 engages drive chain 142 to adjust the tension on the chain.

Thus, the upper laminating roller 110 and the upper primary pull roller 120 are driven directly from the power source 124, while the lower secondary roller 122 is driven from the lower primary pull roller 120. As in the previous embodiment, the lower laminating roller 110 is adjustable through a pneumatic cylinder arrangement 148, while the upper secondary pull roller 122 is adjustable through a cylinder arrangement 149. If desired, the lower primary roller 120 could also be adjustable with respect to the upper roller 120 so that the effective size of the compressible rollers 110 and 120 can be varied to vary the speed. In this embodiment, the lower laminating roller 110 is adjustable by cylinder 148 so that the rollers are disengaged when pressurized air is lost and the machine can automatically be shut down when pressure is lost.

According to one aspect of the present invention, the reversing roller mechanism 116 is adjustable to have the film engage the preheat roller truly parallel to the rotational path of the roller. As shown more clearly in FIGS. 8, 9 and 10, the mechanism 116 includes a primary roller 160 and a secondary roller 162.

The primary roller 160 (FIG. 9) is supported on a shaft 166 having opposite ends received into slots 168 in the frame 102. The shaft 166 has threads 170 at opposite ends which receive a threaded locking knob 172 with an aligning washer 174. Locking collars 176 are releasably secured to shaft 166 to axially position roller 160 on shaft 166. Thus, the locking knobs can be released and the shaft 166 can be shifted in slots 168 to position the shaft in any desired angular orientation with respect to the axis of preheat rollers and locked in position by threaded locking knobs 172. Also, reversing or turnaround roller 160 can be adjusted toward and away from the preheat roller 18 to change the angular contact point of the film or web 114 and to also adjust the tension of the film.

For certain films, the amount of surface contact between the preheat rollers and the film can be reduced. In this instance, the film is entrained over only the secondary roller 162 onto the preheat roller 118.

The film tension is also controlled through a friction-producing means so that the tension of the film between the supply roll 112 and the laminating roller 110 is constant.

For this purpose, roller 112 is carried on a hollow shaft 180. The hollow shaft 180 is supported at opposite ends on support collars 182 that have flattened portions 183 received into elongated slots 184 in the frame 102. The support collars have internal openings 185 which receive a support rod 186 that extends through shaft 180 and has a friction washer 187 which is secured to collar 182 and is in frictional engagement with the end of shaft 180. A bearing member 188 is secured to collar 182.

The support rod is threaded at 189 on opposite ends and a spring 190 is telescoped over rod 186 being interposed between a knob 191 and bearing member 188. Thus, rotation of knob 191 on threads 189 will vary the frictional forces between shaft 180 and friction washers 187. The supply roll 112 is retained on shaft 180 by collars 182.

Lateral adjustment for supply roll 112 is also incorporated into the friction-producing means and includes a threaded bolt 194 fixed to frame 102 with an adjusting member 195 threaded onto bolt 194. Adjusting member 195 has a peripheral groove 196 which receives the periphery of bearing member 188 and has a knurled surface 198. Thus, adjusting member 195 can be rotated on bolt 194 and provides lateral adjustment for support collars 182, along with the support shaft 180.

According to one further aspect of the invention, the preheat rollers and the laminating rollers are heated through a unique known electric heating system that utilizes a readily available electrical power source. As illustrated in FIG. 12, the preheat roller 118 consists of a hollow metal or conductive sleeve 210 that has end plates 212 secured thereto.

The sleeve 210 has a conductive member 214 vulcanized or bonded to the inner surface and a pair of leads 216 extend from member 214. The sleeve 210 and end plates 212 are supported on a shaft 220 which is supported by bearings (not shown) on frame 102.

The shaft 220 has a cutout 222 that receives a rotating electrical connection or coupling 224. The rotating electrical connection 224 rotates with shaft 220 and has power conductors 226 connected by leads 227 extending through an opening 228 and connected to leads 216 by a connector 229.

The electrical coupling 224 has a non-rotating bearing member 230 which has power conductors 232 electrically connected to a power source (not shown) through elbow 234. The power conductors 232, 226 are electrically interconnected through a mercury wetted mechanism in electrical connection 224, which is a commercially available coupling.

According to one further aspect of the invention, the laminating machine also incorporates a simplified cooling mechanism for cooling the laminated article immediately after it exits from the nip of the laminating rollers 110.

Thus, as shown in FIG. 8, the frame 102 has an opening 240 located between the idler mechanisms 116 and a paddle fan 242 is located in the opening. The fan draws ambient air from surrounding atmosphere and blows it across the surfaces of the laminated sheets to withdraw heat. If desired, two fans could be located at opposite edges of the laminated article and these could have ducts with louver openings to direct cooling air to the surfaces of the laminated articles. Other air-directing means could be utilized for directing or distributing the air across the laminating articles.

While the specific embodiments have been illustrated and described, numerous modifications come to mind without significantly departing from the spirit of the invention and the scope of protection is only limited by the scope of the accompanying Claims.

I claim:

1. A method of laminating heat-activated adhesive film to opposite surfaces of an article comprising the steps of feeding a pair of continuous sheets of film having a heat-activated adhesive thereon from separate supply sources between a pair of heated laminating rollers and simultaneously feeding articles between said sheets of film to said laminating rollers, positioning a pair of freely-rotating preheat rollers between said supply sources and said laminating rollers to contact an uncoated surface of said sheets of film, producing a sinusoidal path for said sheets of film to produce extended surface engagement of substantially more than 90° between said sheets of film and both said preheat rollers and said laminating rollers, heating said preheat rollers to a temperature in the range of about 200°-220° F. to heat said sheets of film to a temperature below the activating temperature for said adhesive, and heating said laminating rollers to a temperature in the range of about 250°-260° F. to heat said sheets of film above the heat-activating temperature of said adhesive.

2. A method as defined in claim 1, in which said laminating rollers have exposed surfaces consisting of a synthetic resin polymer having areas of chromium interspersed therein.

3. A method as defined in claim 2, in which said sheets of film are contacted with freely-rotating directing rollers between said supply sources and said preheat rollers to produce said sinusoidal path.

4. A method as defined in claim 1, wherein the step of heating said preheat rollers includes circulating a heated incompressible fluid through said preheat rollers.

5. A method as defined in claim 4, wherein the step of heating said laminating rollers includes circulating heated oil along an independent path through said laminating rollers, the source of oil for said laminating rollers originating from a separate source of oil than said preheat rollers so that a different temperature can be obtained.

6. A method as defined in claim 1, including the further step of contacting said sheets of film with said article therebetween with a pair of compressible driven pull rollers that are adjustable by fluid pressure downstream of said laminating rollers to pull the laminated film with said article therebetween through the laminating rollers, and adjusting the fluid pressure on the pull rollers to vary the effective diameter of the pull rollers and thereby the speed of said pull rollers.

7. A method as defined in claim 6, including the further step of driving one of said laminating rollers and one of said pull rollers while the other of said laminating rollers and said pull rollers are freely rotated.

8. A method as defined in claim 7, in which the others of said laminating rollers and said pull rollers are independently adjustable by varying fluid pressure.

9. A continuous laminating system for double laminating an article comprising a pair of laminating rollers in pressure-engaging contact with each other to form a nip which receives an article to be laminated;

a pair of film supply rolls, each supplying a continuous web of laminating film with heat activatable adhesive thereon into said nip;

a pair of preheat rollers respectively spaced from the respective supply rolls and the laminating rollers and engaging said webs of laminating film;

a pair of reversing rollers respectively between said supply rolls and said preheat rollers producing extended surface contact of approximately 180° between said webs of laminating film and said preheat rollers;

said laminating rollers being positioned so as to have extended surface contact of substantially more than 90° with said webs of laminating film;

a first pair of pull rollers spaced from said laminating rollers with drive means for pulling said webs of laminating film from said supply rolls across said preheat rollers and through said laminating rollers;

first heating means for heating said preheat rollers to a temperature below the activating temperature of said adhesive; and second heating means for heating said laminating rollers to a temperature above said activating temperature of said adhesive to thereby prevent stretching or elongation of the webs of laminating film between the preheat rollers and the laminating rollers.

10. A continuous laminating system as defined in claim 9, and further including a second pair of pull rollers downstream of said first pair of pull rollers with means for varying the speed of said first and second pairs of pull rollers with respect to said laminating rollers.

* * * * *